US010689604B2

(12) United States Patent
Roy et al.

(10) Patent No.: US 10,689,604 B2
(45) Date of Patent: Jun. 23, 2020

(54) METHOD OF MANUFACTURING AN AUTOMATIC DISHWASHING DETERGENT PRODUCT

(71) Applicant: Reckitt Benckiser Finish B.V., Hoofddorp (NL)

(72) Inventors: Pavlinka Roy, Heidelberg (DE); Claudia Schmaelzle, Heidelberg (DE); Caroline Rigobert, Heidelberg (DE); Heike Weber, Mannheim (DE); Helmut Witteler, Wachenheim (DE); Yannick Fuchs, Weinheim (DE); Roland Bohn, Maxdorf (DE)

(73) Assignee: Reckitt Benckiser Finish B.V., Hoofddorp (NL)

( * ) Notice: Subject to any disclaimer, the term of this patent is extended or adjusted under 35 U.S.C. 154(b) by 325 days.

(21) Appl. No.: 15/322,068

(22) PCT Filed: Jul. 1, 2015

(86) PCT No.: PCT/EP2015/065032
§ 371 (c)(1),
(2) Date: Dec. 23, 2016

(87) PCT Pub. No.: WO2016/001327
PCT Pub. Date: Jan. 7, 2016

(65) Prior Publication Data
US 2017/0145356 A1 May 25, 2017

(30) Foreign Application Priority Data

Jul. 2, 2014 (GB) .................................. 1411810.3

(51) Int. Cl.
| | | |
|---|---|---|
| *C11D 11/00* | (2006.01) | |
| *C11D 17/04* | (2006.01) | |
| *C11D 1/66* | (2006.01) | |
| *C11D 1/72* | (2006.01) | |
| *C11D 3/37* | (2006.01) | |
| *C08F 2/08* | (2006.01) | |
| *C08F 2/06* | (2006.01) | |
| *C08F 2/44* | (2006.01) | |
| *C08F 120/06* | (2006.01) | |
| *C11D 3/20* | (2006.01) | |
| *C11D 3/43* | (2006.01) | |

(52) U.S. Cl.
CPC ............ *C11D 11/0023* (2013.01); *C08F 2/06* (2013.01); *C08F 2/08* (2013.01); *C08F 2/44* (2013.01); *C08F 120/06* (2013.01); *C11D 1/66* (2013.01); *C11D 1/72* (2013.01); *C11D 3/2065* (2013.01); *C11D 3/3757* (2013.01); *C11D 3/43* (2013.01); *C11D 17/042* (2013.01); *C11D 17/045* (2013.01)

(58) Field of Classification Search
None
See application file for complete search history.

(56) References Cited

U.S. PATENT DOCUMENTS

| | | | | |
|---|---|---|---|---|
| 4,826,618 | A * | 5/1989 | Borseth | C11D 1/72 510/245 |
| 5,868,964 | A * | 2/1999 | Borseth | C08F 20/04 252/367.1 |
| 5,885,952 | A * | 3/1999 | Kuratli | C11D 3/3788 510/317 |
| 6,200,948 | B1 * | 3/2001 | Traber | D06L 4/614 510/422 |
| 2004/0097674 | A1 | 5/2004 | Suau et al. | |
| 2010/0105596 | A1 * | 4/2010 | Wiedemann | C11D 17/041 510/220 |
| 2016/0152928 | A1 * | 6/2016 | Weber | C08F 2/24 510/222 |

FOREIGN PATENT DOCUMENTS

| | | |
|---|---|---|
| CN | 103320245 A | 9/2013 |
| CN | 105555817 A | 5/2016 |
| EP | 0324569 A2 | 7/1989 |
| EP | 0510580 A1 | 10/1992 |
| JP | 2013155319 A | 8/2013 |
| WO | 2014/108359 A1 | 7/2014 |

OTHER PUBLICATIONS

International Search Report and Written Opinion for related International Patent Application No. PCT/EP2015/065032 dated Oct. 2, 2015.
Search Report for related United Kingdom Patent Application No. GB1411810.3 dated Jan. 26, 2015.
Combined Search and Examination Report for related United Kingdom Patent Application No. GB1411810.3 dated Jan. 27, 2015.
Examination Report for related United Kingdom Patent Application No. GB1411810.3 dated Aug. 22, 2016.
Chinese Office Action and Search Report issued in application No. 201580035848.0 dated May 5, 2018.

* cited by examiner

*Primary Examiner* — Lorna M Douyon
(74) *Attorney, Agent, or Firm* — Troutman Sanders LLP; Ryan A. Schneider; Chris N. Davis

(57) ABSTRACT

The present invention provides a method of manufacturing an automatic dishwashing detergent product, said product being provided as a discrete dosage unit and comprising a continuous, non-aqueous gel phase, comprising manufacturing said gel phase by a method comprising free radical polymerisation of monomer(s) in a non-aqueous reaction mixture to form a polymeric builder; wherein said reaction mixture comprises: at least one non-ionic surfactant which is an optionally end-capped alcohol alkoxylate; and one or more monomers comprising acrylic acid and optionally one or more further $\alpha,\beta$-ethylenically unsaturated acids, wherein no more than 0.1 wt % of the total amount of the monomer(s) are crosslinking monomer(s).

20 Claims, No Drawings

METHOD OF MANUFACTURING AN AUTOMATIC DISHWASHING DETERGENT PRODUCT

TECHNICAL FIELD

The present invention is in the field of automatic dishwashing detergents. In particular, it relates to an automatic dishwashing detergent product that is a discrete dosage unit, comprising a continuous, non-aqueous gel phase. The gel phase is both attractive to consumers and shows good builder performance, and may be suitable for incorporation in a water-soluble container.

BACKGROUND

Unit dose detergent products are convenient for consumers, since there is no need for them to measure out the required volume of detergent each time. Various unit dose formats, including tablets, and containers made of water-soluble material, are already known. Water-soluble containers are attractive since they avoid direct consumer contact with the detergent contents which are potentially irritant, and can have a faster dissolution profile than tablets (because the detergent contents do not need to be compacted particles). Fast dissolution in the wash is often required to release active ingredients from dosage units to be consumed in a single dishwasher run, so that they can become effective as soon as possible, for instance before they are deactivated by the high temperatures of the wash. Containers are preferred for this reason, and also since they are capable of incorporating many more types of composition including liquid, gel and paste compositions, not just solid ones. With multi-compartment containers, more than one type of composition can be incorporated (e.g. one solid and one liquid composition), incompatible ingredients can be kept separate until use, compartments can be designed to release their respective contents at different times in the wash, and/or greater opportunities for improved aesthetics are provided.

In practice in the automatic dishwashing ("ADW") field, the choice of available sizes and shapes of unit dose products is limited by the size and shape of machine dispensers into which they are to be placed. There is also a general demand in the art for more concentrated products which use less packaging and/or confer better performance by including higher amounts of active ingredients. It would therefore be useful to have a compact ADW unit dose detergent composition containing a high level of ingredients contributing to the performance.

When dealing with containers made from water-soluble material, it is also important to ensure this material does not dissolve or deteriorate prior to the intended usage point of the container. Adverse interactions between the container material and the container contents during storage can potentially lead to container deformation, loss of mechanical strength of the product and rendering it unattractive. For these reasons it is helpful for the detergent formulation inside the container to have a low water content. When space is an issue, it is also important to minimise the levels of carriers not contributing to performance in the wash, such as water. Nevertheless, whilst aqueous compositions are to be avoided, the composition must still be capable of dissolution in the wash, and ideally not leave residues on the dishware.

One particularly important type of ingredient in the context of detergent performance is a builder. Builders soften water by removing free cations from the water, thereby increasing the performance of other detergent ingredients which are adversely affected by those cations. Mostly, they react with calcium and/or magnesium ions to form complexes or precipitates. Historically, phosphates like STPP and KTPP have been the mainstay detergent builders, but there are increasing regulatory restrictions on the use of these ingredients worldwide.

Gel formats are visually very attractive to consumers, especially transparent gels. However, there is a conflict between the requirements for low water content, high builder content, and the gel not being opaque. Many available builders are solid at room temperature and do not dissolve in sufficient quantities in the non-water solvents typically used to produce anhydrous gels. For example, phosphates like STPP and KTPP and non-phosphate builders like MGDA and GLDA may be in dissolved form in an aqueous formulation, but may be in the form of dispersed particles in a non-aqueous formulation; dispersed particles can scatter light and render the formulation opaque.

Previously, if a unit dose detergent product was to contain a builder and a transparent fluid, this was usually achieved in the form of a multi-compartment container, carrying builder comprised in a solid composition and/or opaque fluid in one compartment, and a transparent fluid containing no builder in a separate compartment. However, the drive for higher performance and greater concentration of active ingredients has forced the present inventors to look for ways to incorporate builder in the transparent fluid too. In addition, liquids and low viscosity gels are liable to leak out of a container if the container material becomes damaged, so it would be desirable in this context for the transparent fluid to be a self-standing gel.

Certain types of polyacrylic acid (and salts thereof) can act as a builder (c.f. U.S. Pat. No. 3,904,685) and have been included as part of builder systems in commercial tablet and opaque gel ADW formulations. Their carboxylic acid/carboxylate groups allow them to chelate or form salts with the metal ions. As polyelectrolytes, they can also act as dispersants for soils, helping to prevent their redeposition on glass and dishware. For instance, compounds in the Sokalan™ PA range are advertised as dispersants. On the other hand, other types of polyacrylic acid may not have builder capacity, depending on the polymer structure. For example, cross-linked, high molecular weight polyacrylic acid (e.g. in the Carbopol™ range) has been used in low concentrations as a thickener for aqueous liquid ADW systems, together with a non-cross-linked, lower molecular weight polyacrylic acid salt as a builder (cf. U.S. Pat. No. 5,368,766).

Typically, a polyacrylic acid builder is synthesised in aqueous solution, and optionally then dried. Thus, the common forms that are commercially available to the detergent formulator are an aqueous liquid or a spray-dried powder. The formulator may use the powder directly in a tablet formulation, use the aqueous liquid directly in an aqueous liquid detergent formulation, or redissolve the powder in an aqueous liquid detergent formulation. However, there is great difficulty in dissolving high levels of polyacrylic acid builder in non-aqueous systems comprising high levels of non-ionic surfactants. Copolymers of acrylic acid and other monomers that have been tried may have a greater solubility in the surfactant composition, but show lower solubility in the wash liquor and lower performance as a builder.

WO 2004/099274 discloses the formation of a graft polymer in which a polyalkylene glycol forms the backbone, and poly(meth)acrylic acid is grafted as branches onto the backbone. Use of the graft polymer in automatic dishwashing is mentioned. The free radical polymerisation is carried out at 90° C. in the presence of the polyalkylene glycol and water which is charged into the system at a controlled time. The graft polymer is therefore formed in an aqueous system, which may optionally additionally contain an organic solvent. Accordingly, this could not be used directly to form a non-aqueous gel.

EP 0,639,592 discloses the formation of a builder which is a related graft polymer to the one of WO 2004/099274. The polymerisation reaction is carried out at 100° C. or higher in the presence of substantially no solvent of any type; the polyether is melted by heating, to allow the reaction to take place. The ratio of monomers to polyether is at least 0.25:1. Although the polymerisation reaction itself does not utilise a solvent, the polymer is subsequently neutralised using an aqueous base or dissolved in a water/alcohol mixture, such that the end result of the synthesis is an aqueous solution of the graft polymer. Accordingly, it could not be used directly in non-aqueous gels. Furthermore, the examples of detergents in this document are aqueous liquid detergents.

There is still a need in the art for a transparent/translucent, non-aqueous ADW gel containing significant quantities of a builder, preferably a self-standing gel of this type. Such a gel would be advantageous even when not incorporated in a water soluble container, for example if the gel is rigid and stable enough not to require encapsulation in a container.

The present inventors have discovered that polyacrylic acid and related acrylates can be synthesised directly in non-ionic surfactant, in the absence of water, to form an aesthetically appealing gel that is suitable for ADW use and affords good builder and surfactant performance.

SUMMARY OF THE INVENTION

In a first aspect of the invention there is provided a method of manufacturing an automatic dishwashing detergent product, said product being provided as a discrete dosage unit and comprising a continuous, non-aqueous gel phase, comprising manufacturing said gel phase by a method comprising free radical polymerisation of monomer(s) in a non-aqueous reaction mixture to form a polymeric builder; wherein said reaction mixture comprises: at least one non-ionic surfactant which is an optionally end-capped alcohol alkoxylate; and one or more monomers comprising acrylic acid and optionally one or more further $\alpha,\beta$-ethylenically unsaturated acids, wherein no more than 0.1 wt % of the total amount of the monomer(s) are crosslinking monomer(s).

In a second aspect of the invention there is provided an automatic dishwashing detergent product provided as a discrete dosage unit, obtainable by the method according to the invention in its first aspect.

In a third aspect of the invention there is provided an automatic dishwashing detergent product provided as a discrete dosage unit, comprising a continuous, non-aqueous gel phase, said gel phase comprising at least 10 wt % non-ionic surfactant and at least 20 wt % polymeric builder; wherein: said non-ionic surfactant is one or more optionally end-capped alcohol alkoxylates; and said polymeric builder is made by the free radical polymerisation, in a non-aqueous liquid comprising said non-ionic surfactant, of acrylic acid and optionally one or more further $\alpha,\beta$-ethylenically unsaturated acids; and said polymeric builder is at least substantially non-crosslinked and has a weight average molecular weight of no more than 70,000.

In a fourth aspect of the invention there is provided an automatic dishwashing process using the product according to the invention in its second or third aspect.

In a fifth aspect of the invention there is provided the use of the product according to the invention in its second or third aspect for automatic dishwashing.

DETAILED DESCRIPTION

Overview of Product Type

The product manufactured in the invention is a discrete dosage unit and the consumer can conveniently apply it to an automatic dishwashing process without needing to manually measure out the required amount of detergent, unlike with bulk gels or powders. However, although it is preferable for only one such discrete dosage unit to be applied at a time, it is possible that a consumer may dose a plurality (generally 2 or 3) of discrete dosage units simultaneously. Preferably, the discrete dosage unit is designed to complete its function during a single run of the dishwasher (e.g. when the discrete dosage unit comprises a main wash detergent, and optionally also a rinse aid).

The discrete dosage unit comprises a non-aqueous gel phase which is continuous in the normal sense of the word. Accordingly, finely divided gel pieces mixed into a particulate solid composition, or dispersed in a liquid, are not considered to be a continuous gel phase.

Overview of Gel Phase Manufacture

The method of producing the gel phase used in the invention comprises subjecting one or more monomers to free radical polymerisation in the presence of at least one non-ionic surfactant, in a non-aqueous reaction mixture. Preferred ingredients of the reaction mixture are discussed below.

Preferably, the composition at the end of the polymerisation reaction is already in a gelled state or is capable of gelling directly upon cooling. In other words, the method involves forming the gel phase in the invention without an intermediate step of drying this composition to form a solid comprising the polymeric builder. Previously, a solid builder of this type would have needed to be re-dissolved in an aqueous surfactant-containing system, so the resulting gel would be an aqueous one. In contrast, the present invention allows the builder to be synthesised directly together with the non-ionic surfactant and to be in a dissolved state in the resulting composition, which allows the eventual non-aqueous gel to be transparent or translucent, if desired, whilst still including a high concentration of these ingredients.

The free radical polymerisation thus forms a composition with advantages for the formulation of a non-aqueous gel with surfactant and builder properties in automatic dishwashing. Without being bound by theory, this may, for example, be due to an effect of the surfactant as a protective colloid or emulsifier. It is possible that at least a proportion of the polymeric builder exists as a graft polymer comprising both the non-ionic surfactant and polymerised monomers. However, it is preferable for a relatively low proportion (e.g. less than 20%) of the polymeric builder to be in the form of a graft polymer. In an embodiment, none of the polymeric builder is a graft polymer. It is theorised that if the polymeric builder is in the form of a graft polymer with the non-ionic surfactant, its builder performance may be more limited due to steric hindrance restricting its ability to interact with metal ions. Secondary activity as a soil dispersant may also be inhibited. On the other hand, it is also advantageous if the builder and non-ionic surfactant are separable so that, for instance, some of the non-ionic surfactant can potentially carry over into the rinse cycle without some or all of the builder carrying over too.

Although a solid form of the polymeric builder need not be separated out from the composition at the end of the polymerisation reaction, further steps may still advantageously be comprised in the method of the invention in between completion of the polymerisation reaction and provision of the discrete dosage unit comprising the gel phase. For example, other ingredients, e.g. dyes, which may be sensitive to the polymerisation reaction conditions, may be added to the composition after the polymerisation has completed. In an embodiment, the gel phase is thermoreversible. Thus, the composition at the end of the polymerisation may be cooled, forming a gel, which is then reheated to form a lower viscosity liquid and allow the homogeneous incorporation of further ingredients, and subsequently re-cooled to form the gel phase.

The polymerisation reaction will now be described in more detail.

Reaction Mixture Ingredients

Non-Ionic Surfactant

The polymerisation reaction mixture comprises at least one non-ionic surfactant, which is an optionally end-capped alcohol alkoxylate. Preferably, it is low-foaming.

The non-ionic surfactant may be e.g. one that is solid at room temperature, but liquid at the polymerisation temperature. In an embodiment, the non-ionic surfactant is a liquid at 20° C.; this is preferred from the perspective of allowing transparency of the resulting gel. A mixture of non-ionic surfactants may be used, including a mixture of solid and liquid non-ionic surfactants, in which case a predominance of the liquid one(s) is preferred. Preferably, at least 50 wt %, preferably at least 60 wt %, 70 wt %, 80 wt %, 90 wt %, or all, of the non-ionic surfactants are liquid at 20° C.

In an embodiment, the non-ionic surfactant is a mono- or di-($C_1$-$C_6$ alkyl)ether of a polyether polyol.

In an embodiment, the non-ionic surfactant comprises ethoxylate groups. In an embodiment the only alkylene oxide groups in the non-ionic surfactant are ethoxylate groups. In another embodiment, the non-ionic surfactant comprises propylene oxide groups and/or butylene oxide groups, in addition to ethylene oxide groups.

In an embodiment, the optional end cap is a hydroxylated alkyl group, preferably a $CH_2CH(OH)R$ group in which R is alkyl.

In an embodiment, the non-ionic surfactant is of the formula $R^1$—O—$(R^2$—O$)_x$—$(R^3$—O$)_y$—$R^4$, in which:

$R^1$ and $R^4$ are independently H, optionally substituted alkyl or optionally substituted alkenyl, provided that both $R^1$ and $R^4$ are not H;

$R^2$—O and $R^3$—O are different but each independently ethylene oxide, propylene oxide or butylene oxide; and x and y are independently between 0 and 300 (representing the average degree of alkoxylation), with the proviso that at least one of x and y is non-zero.

Where x and y are both non-zero, the order of $R^2$—O and $R^3$—O groups may be varied such that this represents a random or block copolymer.

Preferably, one or more of the following criteria apply:

$R^1$ and $R^4$ are independently H or optionally substituted alkyl, preferably H or optionally hydroxylated alkyl, preferably H or $C_1$-$C_{30}$ alkyl;

$R^1$ is $C_3$-$C_{25}$ alkyl, preferably $C_4$-$C_{22}$ alkyl, preferably $C_5$-$C_{20}$ alkyl, preferably $C_6$-$C_{18}$ alkyl, preferably $C_7$-$C_{15}$ alkyl;

$R^4$ is H or $C_1$-$C_{10}$ alkyl, preferably H or $C_2$-$C_6$ alkyl, preferably H or $C_3$-$C_4$ alkyl;

$R^2$—O is ethylene oxide and x is non-zero, but if $R^3$—O is present, the order of alkoxylate groups may be varied;

x and y are independently between 0 and 100, preferably between 0.5 and 70, preferably between 0.7 and 50, preferably between 0.9 and 30, preferably between 1 and 20, preferably between 1.5 and 10;

the sum of x and y is at least 3, preferably at least 4, preferably at least 5;

$R^2$—O is ethylene oxide and x is at least 3, preferably at least 4, at least 5, or at least 6;

$R^2$—O is ethylene oxide, both x and y are non-zero, and x is greater than y, preferably x is at least double y;

if $R^4$—O is propylene oxide and y is non-zero, y is 18 or less, preferably 17 or less, preferably 15 or less, preferably 10 or less.

In an embodiment, the reaction mixture comprises at least 10 wt %, preferably at least 15 wt %, preferably at least 18 wt %, preferably at least 20 wt %, in total of the non-ionic surfactant(s). Preferably, the total amount of the non-ionic surfactant(s) in the reaction mixture is up to 50 wt %, preferably up to 45 wt %, up to 40 wt %, up to 35 wt %, up to 30 wt %, or up to 25 wt %.

Monomers

The polymerisation reaction mixture also comprises acrylic acid, but is free from any significant amount of crosslinking monomer. Crosslinking monomers include monomers having two unsaturated bonds per molecule. Preferably, the total amount of any crosslinking monomer(s) used is no more than 0.05 wt %, preferably no more than 0.01 wt %, preferably no more than 0.005 wt %, preferably no more than 0.001 wt %, based on the total weight of all the monomers used. Preferably, no crosslinking monomer is used at all. As discussed above, polyacrylic acid that is significantly crosslinked may act as just a thickener, without builder capability.

The acrylic acid monomer is preferably not in the form of an acrylate salt. The unneutralised acid form is a liquid at 20° C. and so its physical state does not hinder its polymerisation. Salts like sodium acrylate, on the other hand, are solids with high melting points.

Optionally, the reaction mixture includes one or more further α,β-ethylenically unsaturated acid monomers, aside from the acrylic acid; preferably a hydrophilic/water-soluble monomer. The further α,β-ethylenically unsaturated acid monomer(s) should be soluble in the reaction mixture. Suitable further monomers include a α,β-ethylenically unsaturated carboxylic acid, sulphonic acid or phosphonic acid, preferably a α,β-ethylenically unsaturated carboxylic acid, preferably methacrylic acid, ethacrylic acid, maleic acid, crotonic acid, itaconic acid, citraconic acid, mesaconic acid, glutaconic acid, aconitic acid, or fumaric acid. Preferably none of the monomers contain phosphorus atoms ("P-free").

In an embodiment, the reaction mixture includes a mixture of acrylic acid and a αβ-ethylenically unsaturated dicarboxylic acid of the formula:

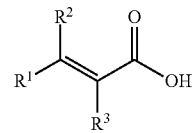

wherein one of $R^1$, $R^2$ and $R^3$ is $C_mH_{2m}CO_2H$ wherein m is 0, 1, 2 or 3, preferably 0 or 1; and the others of $R^1$, $R^2$ and $R^3$ are independently H or $C_nH_{2n+1}$ wherein n is 1, 2 or 3, preferably 1. Preferably, one of $R^1$, $R^2$ and $R^3$ is H.

If such further monomer is used, preferably the weight ratio of acrylic acid to said one or more further α,β-ethylenically unsaturated acids in the reaction mixture is in the range of 100:1 to 1:1, preferably 50:1 to 5:1, preferably 30:1 to 10:1.

In an embodiment, the amount of acrylic acid as a proportion of the total monomer content in the reaction mixture is at least 50 wt %, at least 55 wt %, at least 60 wt %, at least 65 wt %, at least 68 wt %, or at least 70 wt %. Preferably, the amount of acrylic acid as a proportion of the total monomer content in the reaction mixture is up to 90 wt %, up to 85 wt %, up to 80 wt %, or up to 75 wt %.

In an embodiment, the reaction mixture includes acrylic acid and itaconic acid. In an embodiment, no other monomers are used apart from the combination of acrylic acid and itaconic acid. In an embodiment, the amount of itaconic acid as a proportion of the total monomer content in the reaction mixture is at least 10 wt %, at least 15 wt %, at least 20 wt %, at least 25 wt %, at least 28 wt %, or at least 30 wt %. Preferably, the amount of itaconic acid as a proportion of the total monomer content in the reaction mixture is up to 50 wt %, up to 45 wt %, up to 43 wt %, or up to 40 wt %.

In an embodiment, the weight ratio of acrylic acid to itaconic acid in the reaction mixture is: at least 1:1, at least 1.1:1, at least 1.2:1, at least 1.3:1, at least 1.4:1, at least 1.5:1, at least 1.6:1, at least 1.7:1, at least 1.8:1, at least 1.9:1, at least 2:1, at least 2.1:1, at least 2.2:1, or at least 2.3:1; and/or up to 3:1, up to 2.9:1, up to 2.8:1, up to 2.7:1, up to 2.6:1, up to 2.5:1, or up to 2.4:1.

In an embodiment, the only monomer in the reaction mixture is acrylic acid.

In an embodiment, the reaction mixture comprises at least 20 wt %, preferably at least 25 wt %, at least 30 wt %, at least 35 wt %, or at least 40 wt %, in total of the monomer(s). Preferably, the total amount of the monomer(s) in the reaction mixture is up to 70 wt %, preferably up to 65 wt %, up to 60 wt %, up to 55 wt % or up to 50 wt %.

Solvent

The reaction mixture is non-aqueous, in other words it comprises substantially no water, preferably no more than 10 wt % water, preferably no more than 9 wt %, 8 wt %, 7 wt %, 6 wt %, 5 wt %, 4 wt %, 3 wt %, 2 wt %, or 1 wt % water. Preferably, the reaction mixture contains no water at all. However, small amounts of water may be unavoidable, for instance if an initiator, chain transfer agent or other reactant to be used in small quantities can only suitably be delivered in aqueous solution.

On the other hand, bulk polymerisation (in the absence of any solvent at all) can be difficult to control due to lack of effective heat transfer and rapid viscosity increase as the reaction progresses. Accordingly, the use of at least one non-water solvent is desirable. In an embodiment, the reaction mixture comprises a polar/water-soluble organic solvent, preferably a glycol, preferably an alkylene glycol or dialkylene glycol, preferably monopropylene glycol or dipropylene glycol, preferably dipropylene glycol. Other alternative solvents include alcohols, such as $C_1$-$C_6$ alcohols.

The solvent may be one with a relatively low vapour pressure at the polymerisation reaction temperature, such that the weight loss of solvent during the polymerisation reaction is relatively low. In an embodiment, the solvent has a vapour pressure of less than 1 kPa at 25° C. and 1 atm pressure, preferably less than 0.1 kPa, preferably less than 0.01 kPa.

In an embodiment, the reaction mixture comprises the one or more non-water solvents in a total amount of at least 10 wt %, preferably at least 15 wt %, at least 20 wt % solvent, at least 25 wt %, or at least 30 wt %. Preferably, the total amount of non-water solvent(s) is up to 60 wt %, preferably up to 55 wt %, up to 50 wt %, up to 45 wt %, up to 40 wt % or up to 35 wt %.

In the embodiment in which a mixture of acrylic acid and a α,β-ethylenically unsaturated dicarboxylic acid of the formula:

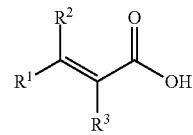

is used, the reaction mixture preferably comprises the one or more non-water solvents in a total amount of: at least 30 wt %, preferably at least 35 wt %, preferably at least 38 wt %, preferably at least 40 wt %; and/or up to 60 wt %, preferably up to 55 wt %, preferably up to 53 wt %, preferably up to 50 wt %.

In an embodiment, less than 20 wt % of the solvent in the reaction mixture is lost (e.g. by evaporation) during the polymerisation reaction, preferably less than 15 wt %, 10 wt % or 5 wt %.

Increasing the monomer concentration in the reaction mixture will tend to increase the viscosity of the composition formed at the end of the polymerisation reaction, whereas increasing the concentration of solvent will tend to decrease its viscosity. Thus, the viscosity can be tailored to the desired application by, inter alia, selecting the appropriate concentration of ingredients in the reaction mixture.

Initiator

The polymerisation reaction usually utilises at least one free radical polymerisation initiator. The initiator desirably acts in solution. Suitable initiators include ones having a peroxo group or azo group. Examples include alkali metal- or ammonium-peroxidisulphate, diacetyl peroxide, dibenzoyl peroxide, succinyl peroxide, di-tert-butyl peroxide, tert-butylperbenzoate, tert-butylperoxypivalate, tert-butylperoxy-2-ethylhexanoate, tert-butylpermaleinate, cumene hydroperoxide, di-isopropylperoxidicarbamate, bi-(o-toluoyl)-peroxide, didecanoylperoxide, dioctanoylperoxide, tert-butylperoctoate, dilauroylperoxide, tert-butylperisobutyrate, tert-butylperacetate, di-tert-amylperoxide, tert-butyl-hydroperoxide, 2,2'-azo-bis-isobutyronitrile, azo-bis-(2-amidinopropan)dihydrochloride, azobis(2,4-dimethylvaleronitrile) or 2,2'-azo-bis-(2-methyl-butyronitrile).

The initiator is selected to give an appropriate reaction speed at the reaction temperature. Preferably, the initiator is an organic peroxide, preferably an alkyl peroxyester.

Also suitable are initiator mixtures or redox initiator systems, such as: ascorbic acid/iron (II) sulphate/sodium peroxodisulphate; tert-butylhydroperoxide/sodium disulphite; tert-butylhydroperoxide/sodium hydroxymethanesulphinate; $H_2O_2$/$Cu^I$.

In the inventive method, the total amount of initiator(s) used in the reaction mixture is preferably in the range of 0.01-10 wt %, preferably 0.05-5 wt %, 0.08-2 wt %, 0.1-1.5 wt %, 0.2-1.0 wt % or 0.3-0.9 wt %. An increase in the level of initiator may affect the reaction speed and typically acts to decrease the molecular weight of the resulting polymer.

The initiator may be supplied to the reaction mixture in its native state or, more usually, pre-mixed with a solvent, preferably at least one solvent selected from the non-water solvents outlined above.

Chain Transfer Agent

The polymerisation reaction mixture desirably includes at least one chain transfer agent, in order to reduce the molecular weight of the polymeric builder obtained without adversely affecting the overall reaction rate. Suitable chain transfer agents are known in the art, for instance as described in detail in Polymer Handbook, 3$^{rd}$ Edition [J Brandrup & E. H. Immergut], John Wiley & Sons, New York, 1989, p. II/81-II/141.

The chain transfer agent may be mono- or multi-functional.

The chain transfer agent is, for example, an aldehyde, such as formaldehyde, acetaldehyde, propionaldehyde, n-butyraldehyde, or isobutyraldehyde. Other suitable chain transfer agents include formic acid and its salts or esters, such as ammonium formate, 2,5-diphenyl-1-hexene, hydroxylamine sulfate, and hydroxylammonium phosphate. Further suitable chain transfer agents are halogen compounds, e.g. alkyl halides such as carbon tetrachloride, chloroform, bromotrichloromethane, bromoform, allyl bromide, and benzyl compounds, such as benzyl chloride or benzyl bromide. Further suitable chain transfer agents are allyl compounds such as allyl alcohol, functionalised allyl ether such as allyl ethoxylates, alkylallyl ether or glycerol monoallylether.

Preferably, the chain transfer agent is not a phosphate, and preferably it is P-free. Preferably, the chain transfer agent is a sulphur-containing compound. Compounds of this type are, for example, inorganic hydrogen sulphite, disulphites and dithionites or organic sulphides, disulphides, polysulphides, sulphoxides and sulphones. These include di-n-butyl sulphide, di-n-octyl sulphide, diphenyl sulphide, thiodiglycol, ethylthioethanol, diisopropyldisulphide, di-n-butyldisulphide, di-n-hexyldisulphide, diacetyldisulphide, di-ethanol sulphide, di-t-butyl trisulphide, dimethyl sulphoxide, dialkyl sulphide, dialkyl disulphide and/or diaryl sulphide.

Preferred chain transfer agents include thiols (compounds comprising —SH groups, also known as mercaptans). Alkyl mercaptans may be used such as n-butyl mercaptan, n-hexyl mercaptan or n-dodecyl mercaptan. Preference is given to chain transfer agents which are mono-, bi-, and polyfunctional mercaptans. Examples of bifunctional chain transfer agents are those that contain two sulfur atoms, such as bifunctional thiols like dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol-bis-thioglycolate and butane-bis-thioglycolate. Examples of polyfunctional chain transfer agents are compounds which contain more than two sulfur atoms, such as trifunctional and tetrafunctional mercaptans.

In an embodiment, the at least one chain transfer agent comprises a mercapto alcohol, mercapto carboxylic acid and/or mercapto carboxylic acid ester. Examples of these compounds are allyl thioglycolates, ethyl thioglycolate, cysteine, 2-mercaptoethanol, 3-mercapto-1-propanol, 3-mercaptopropan-1,2-diol, 4-mercapto-1-butanol, mercaptoacetic acid, 3-mercaptopropionic acid, mercaptosuccinic acid, and thioglycerine.

The total amount of chain transfer agent in the reaction mixture, relative to the total amount of monomer(s), is preferably in the range of 1-40 pphm i.e. parts by weight per hundred parts by weight of the total amount of monomer(s). Preferably, the amount of chain transfer agent is 3-30 pphm, preferably 5-25 pphm.

The total amount of chain transfer agent in the whole reaction mixture is preferably up to 15 wt %, preferably up to 12 wt %, or up to 10 wt %. The total amount is preferably at least 0.1 wt %, at least 0.5 wt %, at least 1 wt %, or at least 2 wt %.

Preferably, the entire reaction mixture is phosphate-free. Preferably, it is P-free.

Reaction Conditions

The free radical polymerisation is preferably conducted at a temperature of up to 90° C., preferably up to 85° C. or 80° C. Preferably, the polymerisation reaction temperature is at least 20° C., preferably at least 30° C., at least 40° C., at least 50° C., at least 60° C., or at least 70° C. Preferably, the polymerisation is carried out at constant or substantially constant temperature, but if desired it may be varied during the reaction.

Preferably, the polymerisation is carried out at ambient pressure.

The polymerisation can be carried out in the presence or absence of an inert gas, such as nitrogen or argon.

The free radical polymerisation is desirably conducted in a feed mode of operation. This means that, of all the raw materials used for the reaction, a portion may be included as an initial charge in a reaction vessel, and the remainder may be fed to the vessel over a period of time, whilst the reaction progresses. Accordingly, where a wt % amount of a raw material in the reaction mixture is quoted herein, this relates to the amount used as a proportion of the total amount of raw materials supplied to the entire polymerisation reaction, and it will be understood that this does not necessarily correlate with the actual concentration in the reaction vessel, either at the start of the reaction or at a later point during the reaction.

The initial charge in the reaction vessel preferably includes at least a portion of the non-ionic surfactant(s) and optionally at least a portion of the solvent. Preferably the initial charge does not include any monomer and/or initiator.

When a chain transfer agent is used, preferably none or only a portion of it is included in the initial charge. Preferably, all of the chain transfer agent that is used is supplied in a feed.

The feed(s) are preferably selected to achieve the desired conversion rate for the polymerisation. Individual feeds can be supplied continuously or at intervals, with constant or variable flow rate, and multiple feeds can be supplied simultaneously or at different times. Preferably, the feed(s) are supplied simultaneously, continuously and with as constant as possible a flow rate. Typically, the initial charge is heated with stirring to the polymerisation temperature prior to the addition of the feed(s).

Preferably the feed(s) are supplied to the reaction vessel over a period of 1 to 10 hours, preferably 2 to 8 hours, preferably 3 to 5 hours, preferably 3.5 to 4.5 hours. Preferably, once all the feed(s) have been supplied to the reaction vessel, the temperature is maintained at the polymerisation temperature for at least 30 minutes, preferably at least 45 minutes, preferably at least an hour.

After completion of the polymerisation, the composition is optionally cooled, for example to 20° C.

In an embodiment, acid groups are partially or completely non-neutralised in the polymeric builder. Preferably, the method of the invention does not involve neutralisation of acid groups, either via a post-polymerisation neutralisation step or via neutralisation during the polymerisation reaction.

Preferably, there is no other step employed which would cause crosslinking of the polymeric builder, e.g. involving post-polymerisation heat treatment, irradiation or chemical crosslinking.

Formation of the Continuous Gel Phase and its Properties

As discussed above, the composition at the end of the polymerisation reaction is preferably already in a gelled state or is cooled to form a gel. This composition may therefore contain residual components from the polymerisation reaction as impurites, such as residual initiator, chain transfer agent and/or monomer. It may be used directly as the continuous gel phase in the invention, or additional ingredients may be added to form the final gel phase, before or after any cooling step.

Such additional ingredients may include, for example, additional solvent, non-ionic surfactant or thickener, to adjust the viscosity, and minor additives such as dyes or fragrances. However, preferably no additional solvent, surfactant or thickener is added (save for minor amounts of solvent which may be used for delivery of dyes and/or fragrances).

In an embodiment, the gel phase in the discrete dosage unit does not include any ionic surfactant, builder (apart from the polymeric builder), enzyme, and/or bleach. Such optional ingredients can be included in other parts of the discrete dosage element, if required.

In an embodiment, any ingredients added after the polymerisation stage make up a total amount of no more than 15 wt % of the final gel phase, preferably no more than 12 wt %, no more than 10 wt %, no more than 8 wt %, no more than 5 wt %, no more than 3 wt %, or no more than 1 wt %, of the final gel phase. Accordingly, the concentration of a component in the gel phase in the discrete dosage unit may be within the same range as quoted above for the level of the corresponding component in the reaction mixture.

Preferably, the gel phase in the discrete dosage unit comprises 5-50 wt %, preferably 20-30 wt %, non-water solvent. The water level of the gel phase may be slightly increased compared to the reaction mixture, e.g. due to the subsequent addition of dyes in aqueous solution. However, the continuous gel phase is still non-aqueous, preferably in the sense that it contains no more than 6 wt % water, preferably no more than 5 wt %, 4 wt %, 3 wt %, 2 wt or 1 wt % water.

Determining the amount of non-ionic surfactant and polymerised monomers in the gel may be complicated in the event that there is at least partial formation of a graft polymer. However, it may be possible to estimate this e.g. by inference from the level of ingredients in the reaction mixture and knowledge of the reaction system.

In an embodiment, the gel phase comprises 10-50 wt % non-ionic surfactant, preferably 15-30 wt non-ionic surfactant. In an embodiment, the gel phase contains at least 20 wt % of the polymeric builder, preferably at least 25 wt %, at least 30 wt %, at least 35 wt %, or at least 40 wt % of the builder. Preferably, the gel phase contains up to 60 wt %, up to 55 wt % or up to 50 wt % of the builder.

The weight average molecular weight of the polymeric builder may be determined by gel permeation chromatography using neutralised polyacrylic acid as a polymer standard. The eluent is 0.08 mol/l Tris, pH 7.0+0.15 mol/l NaCl+0.01 mol/l NaN$_3$ in deionised water, with a flow rate of 0.8 ml/min. The column set is one guard column (l=5 cm) and 2 separation columns (l=30 cm each), and the column temperature is 35° C. The detector is a DRI (refractive index detector) Agilent 1100.

In an embodiment, the weight average molecular weight of the polymeric builder, as determined by the above method, is in the range of 1000-70000 g/mol, preferably 1500-50000 g/mol, preferably 1800-10000 g/mol, preferably 2000-9000 g/mol, 3000-8000 g/mol, 3500-7500 g/mol, or 4000-7300 g/mol. Preferably, when the polymeric builder is made from acrylic acid as the only monomer, the weight average molecular weight is no more than 10000 g/mol. Copolymers may have a higher molecular weight. The molecular weight of the polymeric builder can be controlled in a manner known in the art e.g. using a chain transfer agent in a suitable amount, and/or controlling the amount and type of initiator, as discussed above.

In the embodiment in which a mixture of acrylic acid and a α,β-ethylenically unsaturated dicarboxylic acid of the formula:

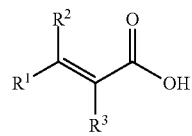

is used, the weight average molecular weight of the polymeric builder is preferably: at least 5000 g/mol, at least 7000 g/mol, at least 10000 g/mol, at least 15000 g/mol, at least 20000 g/mol, at least 25000 g/mol, at least 30000 g/mol, at least 35000 g/mol, at least 40000 g/mol, at least 43000 g/mol, at least 45000 g/mol, or at least 48000 g/mol; and/or up to 65000 g/mol, up to 63000 g/mol, up to 60000 g/mol, up to 55000 g/mol, up to 53000 g/mol, or up to 50000 g/mol.

Preferably up to 40 mol %, 30 mol %, 20 mol %, 10 mol %, 5 mol %, or none, of the acid groups in the polymeric builder are in neutralised form. In an embodiment, the polymeric builder has a content of acid groups of 1.5 to 15 mmol/g, preferably 2 to 10 mmol/g, preferably 3 to 8 mmol/g, preferably 4 to 7 mmol/g.

In an embodiment, the gel phase is phosphate free. In an embodiment, it is P-free.

The following properties of the gel phase are determined at 20° C., 1 bar pressure, unless otherwise stated.

Ideally the viscosity of the gel phase should be selected to achieve a balance between speed of dissolution in the wash and reduced rate of leakage out of a ruptured container or packaging. Whilst appreciating that the chemical nature of the gel will also affect its solubility, a less viscous gel will tend to exit a container faster during the wash, upon dissolution of the surrounding container material. The desire for a high content of actives will also be an influencing factor.

In an embodiment, the gel phase has a viscosity of at least 200 mPa·s, preferably at least 400 mPa·s, at least 600 mPa·s, at least 800 mPa·s, at least 1000 mPa·s, at least 1500 mPa·s, at least 2000 mPa·s, at least 5000 mPa·s, at least 10,000 mPa·s, at least 20,000 mPa·s, at least 30,000 mPa·s, or at least 50,000 mPa·s.

In an embodiment, the gel phase has a viscosity of at least 100,000 mPa·s, at least 500,000 mPa·s, at least 1,000,000 mPa·s, at least 5,000,000 mPa·s, or at least 10,000,000 mPa·s, at 20° C. as measured with a rotational rheometer (DHR-1 TA-Instruments, parallel discs, Ø40 mm, h=1 mm).

In an embodiment, the gel phase is self-standing, and does not flow at 20° C., 1 atm pressure. Such a gel is too viscous for reliable viscosity measurements to be made at 20° C. using a device such as a Brookfield viscosimeter.

The gel phase may be thermoreversible, and its viscosity when heated to 50° C. may desirably be less than 5000 mPa·s, less than 1000 mPa·s, less than 500 mPa·s, or less than 200 mPa·s, as measured with a Brookfield viscosimeter. This facilitates e.g. its filling into a container when heated to a pourable, lower viscosity liquid, and cooling to form a higher viscosity gel phase, especially a self-standing gel, which it would not be possible to pour at room temperature.

In an embodiment, the continuous gel phase is translucent or transparent, preferably transparent. Transparency and translucency can be visually observed by the skilled person. In an embodiment, the continuous gel phase is colourless and has a light transmission level $T_L$ (amount of transmitted light as a percentage of incident light) at 500 nm of at least 70%, preferably at least 75%, preferably at least 80%, preferably at least 85%, preferably at least 87%, preferably at least 90%, relative to distilled water which is designated as having a $T_L$ of 100%. In another embodiment, it is a coloured gel due to the inclusion of a dye or other colourant, however in the absence of the colourant it would be a colourless gel having a light transmission level at 500 nm of at least 70%, preferably at least 75%, preferably at least 80%, preferably at least 85%, preferably at least 87%, preferably at least 90%, compared to distilled water.

The desirable speed of dissolution in the wash depends on the desired use. In an embodiment, the discrete dosage unit is adapted to dissolve during a single run of the dishwasher. A dishwasher "run" is understood as one complete dishwasher program, which may include one or more wash cycles, rinse cycles, etc.

In an embodiment, the continuous gel phase has a dissolution time in water of 20 minutes or less according to the method described below, preferably 19, 18, 17, 16, 15, 14, 13, 12, 11 or 10 minutes or less. Such a gel phase is suitable for use in a discrete dosage unit to be consumed in a single dishwasher run.

A 1 l glass beaker is filled with 800 ml water which is at 45° C. and has a hardness of 18° gH. The beaker is equipped with a magnetic stirrer bar rotating at 250 revolutions per minute. A 2 g cube of gel is placed inside a metal tea strainer of the clam-shell type (diameter 4 cm, 1 mm holes in the mesh) and immersed in the water above the stirrer bar. The time it takes for the gel to be fully dissolved (by visual inspection, no gel left inside the tea strainer) is measured.

Discrete Dosage Unit Format

The discrete dosage unit may comprise a container containing the gel phase. Preferably, a composition is filled into the container and cooled to form the gel phase. Alternatively, if the gel phase used in the invention is self-standing, it need not be filled into a container to be provided as a discrete dosage unit, but may serve alone as the discrete dosage unit.

If the discrete dosage unit comprises a container, this is preferably a water-soluble container. Known processes for manufacturing containers from water-soluble materials include thermoforming, vacuum-forming, vertical form-fill-sealing, horizontal form-fill-sealing, and injection moulding. In an embodiment, the container is made by injection moulding.

The walls of the container may be made from the same or different container materials. If they are made of the same material, they may be of different thicknesses. If they are made of different materials, they may be of different thicknesses and/or the materials may have a different inherent solubility.

The materials typically comprise a water-soluble polymer and optionally one or more additives as is known in the art, e.g. plasticiser, filler and so on.

Suitable polymers are polyvinyl alcohols, polyvinyl acetates, cellulose, cellulose ethers, and polysaccharides such as starch and gelatine. Preferred are polyvinyl alcohols, polyvinyl alcohol copolymers and hydroxylpropyl methyl cellulose, and combinations thereof. Most preferably the container material(s) comprise PVOH or a PVOH copolymer. Partially hydrolysed PVOH, as is known in the art, is particularly suitable. The container material(s) may comprise a blend of polymers, e.g. a blend of PVOH polymers of different grades.

The discrete dosage unit may have any suitable size and shape overall. If it is designed to be dispensed from the dispenser compartment of the dishwasher, to make most efficient use of the available space, the container preferably has a cuboidal shape, e.g. a cube or a rectangular cuboidal shape, preferably a rectangular cuboidal shape. It will be understood in the context of the invention that these terms do not imply mathematical precision; slight bulges of the faces and rounding of the edges may be expected, consistent with the flexible nature of the container material(s) and pressure exerted by the contents.

In an embodiment, the total volume of the discrete dosage unit is 40 ml or less, preferably 35 ml or less, preferably 30 ml or less, preferably 25 ml or less, preferably 20 ml or less. Suitably the longest dimension of the discrete dosage unit is in the range of 2 to 6 cm, preferably 2.5 to 5 cm, preferably 3 to 4 cm.

If the discrete dosage unit is designed to be used outside the dispenser compartment, it is less restricted in size and shape.

In an embodiment, the discrete dosage unit is a container comprising at least 2 compartments. In an embodiment, the container has 2 or 3 compartments. Each compartment of the multi-compartment container may independently comprise any suitable form of composition, including solid, liquid, gel, paste, provided that at least one compartment contains the continuous gel phase of the invention. In an embodiment, the container contains the continuous gel phase of the invention in at least one compartment, and a solid composition in at least one further, separate compartment. Preferably, this solid composition is a particulate solid, preferably a powder. Thus, desirable solid components of the overall detergent to be supplied (such as solid builder, bleach, enzymes, etc.) can be included in the container in high amounts, without the formulation problems of trying to include them in the gel phase of the invention.

In another embodiment, the container has at least three compartments, one containing a transparent or translucent gel phase of the invention, one containing an opaque gel, and one containing a solid, especially powder, composition. Thereby both solid and liquid ingredients can be utilised which might otherwise suffer from difficulties in formulating them in the inventive gel phase.

If aqueous gels or liquids are contained in a compartment that shares a wall with another compartment in the container, water is liable to migrate through the container wall. This can cause adverse interactions e.g. degradation of a moisture-sensitive ingredient in the other compartment (such as a bleach or an enzyme), and/or swelling of a particulate solid formulation in the other compartment, causing it to burst the compartment walls. Thus, use of the non-aqueous gel phase of the invention brings an additional advantage in this instance.

Optional Ingredients in Other Parts of the Dosage Unit

Optional dishwashing ingredients which may be included in the discrete dosage unit, but preferably not in the continuous gel phase, are known in the art. Mention may be made of, for example, one or more further builders (other than the polymeric builder), further non-ionic surfactants, enzymes, bleaches, bleach activators, bleach catalysts, alkalis, defoamers, and glass protection agents.

In an embodiment, the discrete dosage unit contains no ionic surfactant.

In an embodiment, the continuous gel phase makes up at least 10 wt % of the discrete dosage unit (excluding the weight of the container material, if present), preferably at least 15 wt %, preferably at least 20 wt %, of the discrete dosage unit. In an embodiment, the discrete dosage unit comprises up to 50 wt %, preferably up to 45 wt %, up to 40 wt %, up to 35 wt % or up to 30 wt % of the continuous gel phase.

Preferred features of the first and second aspects of the invention apply mutatis mutandis to the third aspect of the invention.

ADW Use

The fourth and fifth aspects of the invention relate to the application of the discrete dosage unit in automatic dishwashing. Preferably, the discrete dosage unit is used in a dishwasher run that lasts at least 30 minutes, preferably at least 35, 40, 45, 50, 55 or 60 minutes. In an embodiment, the discrete dosage unit is released from a dispenser compartment of the dishwasher, during the dishwashing process.

EXAMPLES

The invention is further demonstrated by the following non limiting examples.

A glass reactor equipped with three inlets, nitrogen inlet and stirrer was charged with the non-ionic surfactant, optionally a chain transfer agent, and optionally a solvent, in the amounts shown in Table 1. It was rinsed for a few minutes with nitrogen and heated to 75° C. Feeds 1 to 3 were connected to the flask and simultaneously added over 4 hours at 75° C. with stirring at 100 revolutions/minute. Feed 1 contained the monomer component (acrylic acid), feed 2 contained a polymerization initiator dissolved in a small amount of the non-ionic surfactant and/or solvent, and feed 3 optionally contained a further amount of chain transfer agent. After the addition of feeds 1 to 3, the composition was stirred for an additional hour at 75° C. with stirring at 100 revolutions/minute, for post-polymerization. The polymer was poured into a beaker and immediately cooled to room temperature.

The transparency of the resulting gel was observed visually and noted. It was also observed whether or not the gel was self-standing. The molecular weight of the polymeric builder was determined by the gel permeation chromatography method described above. The synthesis variables and the results are summarised in Table 2.

TABLE 1

| | Initial charge | Feed 1 | | Feed 2 | | Feed 3 | |
|---|---|---|---|---|---|---|---|
| Ex. | Weight (g) of surfactant | Weight (g) of chain transfer agent | Weight (g) of solvent | Weight (g) of acrylic acid | Weight (g) of initiator[#] | Weight (g) of surfactant | Weight (g) of solvent | Weight (g) of chain transfer agent | Weight (g) of solvent |
| 1 | 123[1] | 45* | 95 | 253 | 2.40 | 5[5] | 95 | 12* | 0 |
| 2 | 123[1] | 45* | 95 | 253 | 2.40 | 5[5] | 95 | 12* | 0 |
| 3 | 230[1] | 0 | 290 | 540 | 5.11 | 10[5] | 65 | 10.8** + 29.5*** | 19.8 |
| 4 | 230[2] | 0 | 290 | 540 | 5.11 | 10[1] | 65 | 10.8** + 29.5*** | 19.8 |
| 5 | 170[1] + 60[3] | 0 | 320 | 480 | 4.54 | 10[5] | 75 | 9.6** + 26.2*** | 44.2 |
| 6 | 230[1] | 0 | 310 | 420 | 3.98 | 10[5] | 146 | 8.4** + 22.9*** | 48.7 |

[1]Surfactant was the reaction product of a $C_{13}$-$C_{15}$ alcohol, EO and BO in a molar ratio of 1:9:2
[2]Surfactant was the reaction product of tridecanol, EO and PO in a molar ratio of 1:5.5:2
[3]Surfactant was the reaction product of a $C_6$ alcohol and EO in a molar ratio of 1:6 (starting from hexylglycol or hexyldiglycol)
*Chain transfer agent was (2-ethylhexyl)thioglycolate
**Chain transfer agent was 2-mercaptoethanol
***Chain transfer agent was $NaH_2PO_2$ (55% aqueous solution)
[#]Initiator was tertiary-butyl peroxypivalate (purity: 75%) (CAS No. 927-07-01)

TABLE 2

| | Composition of reaction mixture | | | | | | Gel properties | |
|---|---|---|---|---|---|---|---|---|
| Ex. | Surfactant | Solvent | Total wt % surfactant | Total wt % solvent | Wt % acrylic acid | Total wt % chain transfer agent | $M_w$ of the polyacrylic acid (g/mol) | Transparent? | Self-standing? |
| 1 | EO/BO[1] | MPG | 20 | 30 | 43 | 9 | 7100 | Yes | Yes |
| 2 | EO/BO[1] | DPG | 20 | 30 | 43 | 9 | 6000 | Yes | Yes |
| 3 | EO/BO[1] | DPG | 20 | 31 | 45 | 3 | 4200 | Yes | Yes |
| 4 | EO/PO[2] | DPG | 20 | 31 | 45 | 3 | 4700 | Yes | Yes |
| 5 | EO/BO[1] + EO[3] | DPG | 20 | 37 | 40 | 3 | 4200 | Yes | Yes |
| 6 | EO/BO[1] | DPG | 20 | 42 | 35 | 3 | 4200 | Yes | No |

A range of gels comprising copolymeric builders were synthesized in a similar manner using a reaction mixture comprising acrylic acid (AA) and itaconic acid (IA) as the monomers, with an AA:IA weight ratio of 70:30 or 60:40. The amount of non-ionic surfactant in the reaction mixture was 20 wt % in each case. The reaction mixture included either i) 50 wt % DPG, or ii) 40 wt % DPG+10 wt % water, as the solvent(s). The weight average molecular weight of the AA/IA builder was varied from 7830 to 48500 g/mol. All these gels were transparent.

Identical batches of water-soluble, polyvinyl alcohol injection moulded 3-compartment containers were prepared and filled with the following base formulations:

TABLE 3

| Compartment 1: 9 g of Powder 1: | | Compartment 2: 1.3 g of Powder 2: | |
|---|---|---|---|
| Ingredient | % by weight | Ingredient | % by weight |
| Trisodium citrate | 15 | TAED | 25 |
| Dispersing agent (Sokalan ™ PA 30 CL Granules[4]) | 10 | Dispersing agent (Sokalan ™ PA 30 CL Granules[4]) | 22 |
| Sodium carbonate | 30 | Sodium carbonate | 25 |
| Sodium percarbonate | 45 | Protease | 23 |
| | | Amylase | 5 |

[4]Polyacrylic acid, sodium salt (Molecular weight 8000 g/mol)

The gels of each of Examples 1-6 were respectively heated to a low viscosity liquid and optionally combined with a dye to make them coloured. The third compartment of each batch of the containers was then filled with 4 g of one of these respective liquids and allowed to cool to reform the gel phase. On cooling, the transparency is maintained.

In comparative batches of the containers, the third compartment was filled instead with 4 g of pure non-ionic surfactant, in each case corresponding to the surfactant used in the inventive gel.

The containers were each subjected to a dishwashing test according to the IKW method. Cleaning performance of each of the containers comprising a gel phase of Examples 1-6 was better than the comparative containers, indicating that the polymer in the gel phase is performing as a builder. Furthermore, each of the dosage units dissolved completely in the wash and left no residues on the dishes.

After storage for 12 weeks at 40° C., 75% relative humidity, the containers containing the gel phase of Examples 1-6 were intact without any cracks or deformation.

The synthesized AA/IA builder-containing gels were subjected to similar tests. All showed builder performance (better cleaning than the comparative containers in which the gel was substituted for the pure non-ionic surfactant).

The invention claimed is:

1. A method of manufacturing an automatic dishwashing detergent product being provided as a discrete dosage unit and comprising a continuous, non-aqueous gel phase comprising manufacturing the gel phase by a method comprising free radical polymerization of one or more monomers in a non-aqueous reaction mixture to form a polymeric builder without an intermediate step of drying the reaction mixture to form a solid comprising the polymeric builder;
wherein the polymeric builder is in a dissolved state in the non-aqueous gel phase,
wherein the reaction mixture comprises:
10 wt % to 50 wt % of a non-ionic surfactant;
10 wt % to 60 wt % of at least one non-water solvent; and
a monomer comprising acrylic acid,
wherein no more than 0.1 wt % of the total amount of the monomer is a crosslinking monomer.

2. The method according to claim 1, wherein the monomer consists of acrylic acid.

3. The method according to claim 1, wherein the free radical polymerization is conducted at a temperature in the range of 20 to 90° C.

4. The method according to claim 1, wherein the free radical polymerization is conducted at a temperature in the range of 40 to 80° C.

5. The method according to claim 1, wherein the free radical polymerization is conducted in the presence of a chain transfer agent.

6. The method according to claim 1, wherein the free radical polymerization is conducted in a feed mode of operation, in which at least a portion of the non-ionic surfactant is present in an initial charge, and at least a portion of the monomer and at least one radical initiator is fed to the initial charge.

7. The method according to claim 1, wherein up to 40 mol % of acid groups in the polymeric builder are in neutralized form.

8. The method according to claim 1, wherein the gel phase is free of any ionic surfactant.

9. The method according to claim 1, wherein the reaction further comprises a monomer comprising α,β-ethylenically unsaturated acid; and
wherein no more than 0.1 wt % of the total amount of the monomers are crosslinking monomers.

10. The method according to claim 9, wherein the non-ionic surfactant comprises an end-capped alcohol alkoxylate.

11. The method according to claim 10, wherein the alcohol alkoxylate non-ionic surfactant is liquid at 20° C.

12. The method according to claim 9, wherein the reaction mixture comprises at least 20 wt % in total of the monomers.

13. The method according to claim 9, wherein the reaction mixture is free of crosslinking monomers.

14. The method according to claim 9, wherein the reaction mixture comprises:
at least 20 wt % in total of the non-ionic surfactant; and
at least 40 wt % in total of the monomers.

15. The method according to claim 9, wherein the α,β-ethylenically unsaturated acid is a carboxylic acid selected from the group consisting of methacrylic acid, ethacrylic acid, maleic acid, crotonic acid, itaconic acid, citraconic acid, mesaconic acid, glutaconic acid, aconitic acid, and fumaric acid.

16. The method according to claim 9, wherein the weight ratio of acrylic acid to α,β-ethylenically unsaturated acid in the reaction mixture is in the range of 100:1 to 1:1.

17. The method according to claim 1, wherein the non-water solvent is a water-soluble organic solvent selected from the group consisting of alkylene glycol, dialkylene glycol, monopropylene glycol, and dipropylene glycol.

18. The method according to claim 1, wherein the alcohol alkoxylate non-ionic surfactant is of the formula R1-O-(EO)x(AO)y-R4, in which:
R1 is an alkyl group;
R4 is H or an optionally substituted alkyl group;
x is 1 to 100;
y is 0 to 100;
EO is ethylene oxide; and
each AO, when present, is independently propylene oxide or butylene oxide;
wherein x and y represent the average degrees of respective alkoxylation per molecule; and wherein the order of EO and AO groups may be varied but the sum of x and y is at least 3.

19. The method according to claim 1 further comprising providing the gel phase in a water-soluble container.

20. The method according to claim 1 further comprising:
providing the gel phase in a compartment of a multi-compartment water-soluble container; and
providing a solid composition in a different compartment of the multi-compartment water-soluble container;
wherein the solid composition comprises a component selected from the group consisting of bleach, enzyme and builder.

* * * * *